(12) United States Patent
Conover (10) Patent No.: US 7,359,439 B1
(45) Date of Patent: Apr. 15, 2008

(54) ENCODING A STILL IMAGE INTO COMPRESSED VIDEO

(75) Inventor: Mark D. Conover, Cupertino, CA (US)

(73) Assignee: Pixel Tools Corporation, Cupertino, CA (US)

( * ) Notice: Subject to any disclaimer, the term of this patent is extended or adjusted under 35 U.S.C. 154(b) by 687 days.

(21) Appl. No.: 09/168,644

(22) Filed: Oct. 8, 1998

(51) Int. Cl.
*H04N 7/18* (2006.01)

(52) U.S. Cl. .......................... 375/240.12; 375/240.13; 375/240.26

(58) Field of Classification Search ................ 345/418, 345/509; 370/389; 375/240.1, 240.12–240.15, 375/240.21, 240.24–240.27, 240.16; 382/232, 382/236, 233, 238; 386/6; *H04N 7/24*
See application file for complete search history.

(56) References Cited

U.S. PATENT DOCUMENTS

| | | | | |
|---|---|---|---|---|
| 5,404,446 A | * | 4/1995 | Bowater et al. ............ 345/509 |
| 5,534,937 A | * | 7/1996 | Zhu et al. .............. 375/240.27 |
| 5,661,821 A | * | 8/1997 | Kimura et al. .............. 382/232 |
| 5,689,589 A | * | 11/1997 | Gormish et al. ............ 382/232 |
| 5,838,678 A | * | 11/1998 | Davis et al. ................ 370/389 |
| 5,949,948 A | * | 9/1999 | Krause et al. ................. 386/6 |
| 6,058,210 A | * | 5/2000 | de Queiroz et al. ........ 382/236 |
| 6,072,548 A | * | 6/2000 | Schoner et al. ........ 375/240.26 |
| 6,078,328 A | * | 6/2000 | Schumann et al. ......... 345/418 |
| 6,134,270 A | * | 10/2000 | Mou ...................... 375/240.21 |
| 6,310,919 B1 | * | 10/2001 | Florencio ............... 375/240.16 |
| 6,324,217 B1 | * | 11/2001 | Gordon ................. 375/240.16 |

\* cited by examiner

*Primary Examiner*—Anand Rao
(74) *Attorney, Agent, or Firm*—Donald E. Schreiber (57) ABSTRACT

A method for producing a compressed video bitstream having a plurality of frames from data that specifies a single still image. The still image is encoded into data specifying a single intra ("I") frame having an amount of data that approaches, but remains less than, storage capacity of a buffer memory included in a decoder. A single copy of the I frame data is then combined in the compressed video bitstream with data for at least one null frame. Decoding of the compressed video bitstream assembled in this way produces frames of decoded video that do not appear to pulse visually.

7 Claims, 3 Drawing Sheets

ENCODING A STILL IMAGE INTO COMPRESSED VIDEO

BACKGROUND OF THE INVENTION

1. Field of the Invention

The present invention relates generally to devices and methods for video compression, and more particularly to devices and methods for video compression of motionless images.

2. Description of the Prior Art

Video and audio signals making up a conventional television broadcast may be digitized and then compressed in accordance with standards established by the International Organization for Standardization ("ISO") and International Electrotechnical Commission ("IEC"). One of these standards, ISO/IEC 11172, is generally identified by the popular name MPEG-1. A technologically related standard, ISO/IEC-13818, is identified by the popular name MPEG-2. The MPEG-1 and MPEG-2 standards respectively define a serial system stream, i.e. a bitstream that contains both compressed video and audio data, that is well suited for quality:

1. video playback from digital storage media such as a hard disk, CD-ROM, or digital video disk ("DVD"); and
2. transmission such as over a cable antenna television ("CATV") system or high bit rate digital telephone system, e.g. a T1, ISDN Primary Rate, or ATM digital telecommunications network.

The MPEG-1 and MPEG-2 standards are hereby incorporated by reference.

Figure 1:
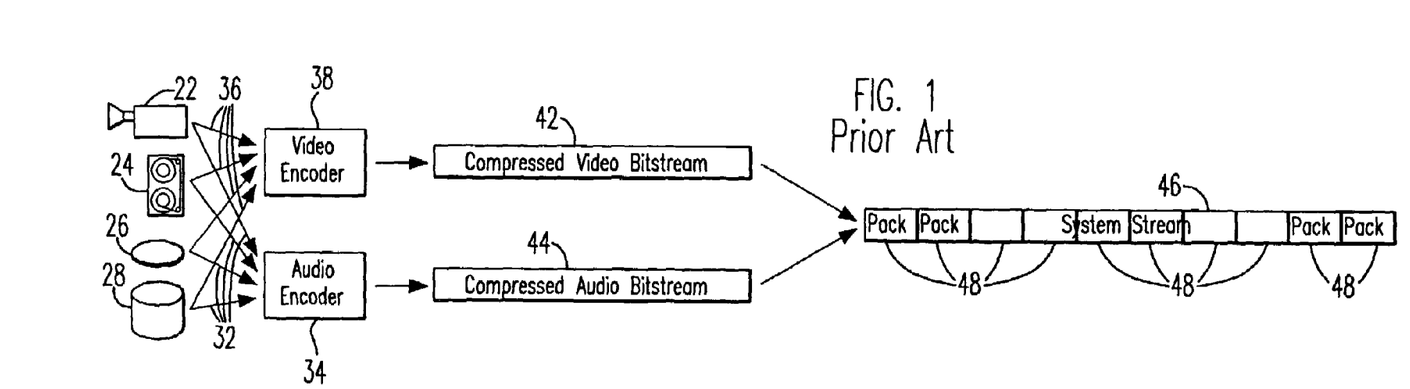
FIG. 1 is a block diagram illustrating portions of the prior art conventional MPEG video compression process for forming a serial system stream including encoding of a compressed video bitstream.

The block diagram of FIG. 1 graphically illustrates a portion of the process by which video and audio signals making up a conventional television broadcast are digitized and then compressed during assembly of an MPEG-1 or MPEG-2 serial system stream. In the illustration of FIG. 1, a video camera 22, video tape player 24, video disk player 26 or some other type of video-data storage-device 28 supply both:

3. an audio signal, indicated in FIG. 1 by an arrow 32, to an audio encoder 34; and
4. a video signal, indicated in FIG. 1 by an arrow 36, to a video encoder 38.

In accordance with either of the MPEG standards, the encoders 34 and 38 first digitize the respective signals 32 and 36, and then encode the digitized signals 32 and 36 respectively into a MPEG compressed video bitstream 42 and a MPEG compressed audio bitstream 44. Subsequently during the MPEG compression process, as illustrated in FIG. 1 a MPEG serial system stream 46 is assembled by concatenating packs 48 of compressed data selected respectively from the compressed video bitstream 42 and the compressed audio bitstream 44.

Figure 2:
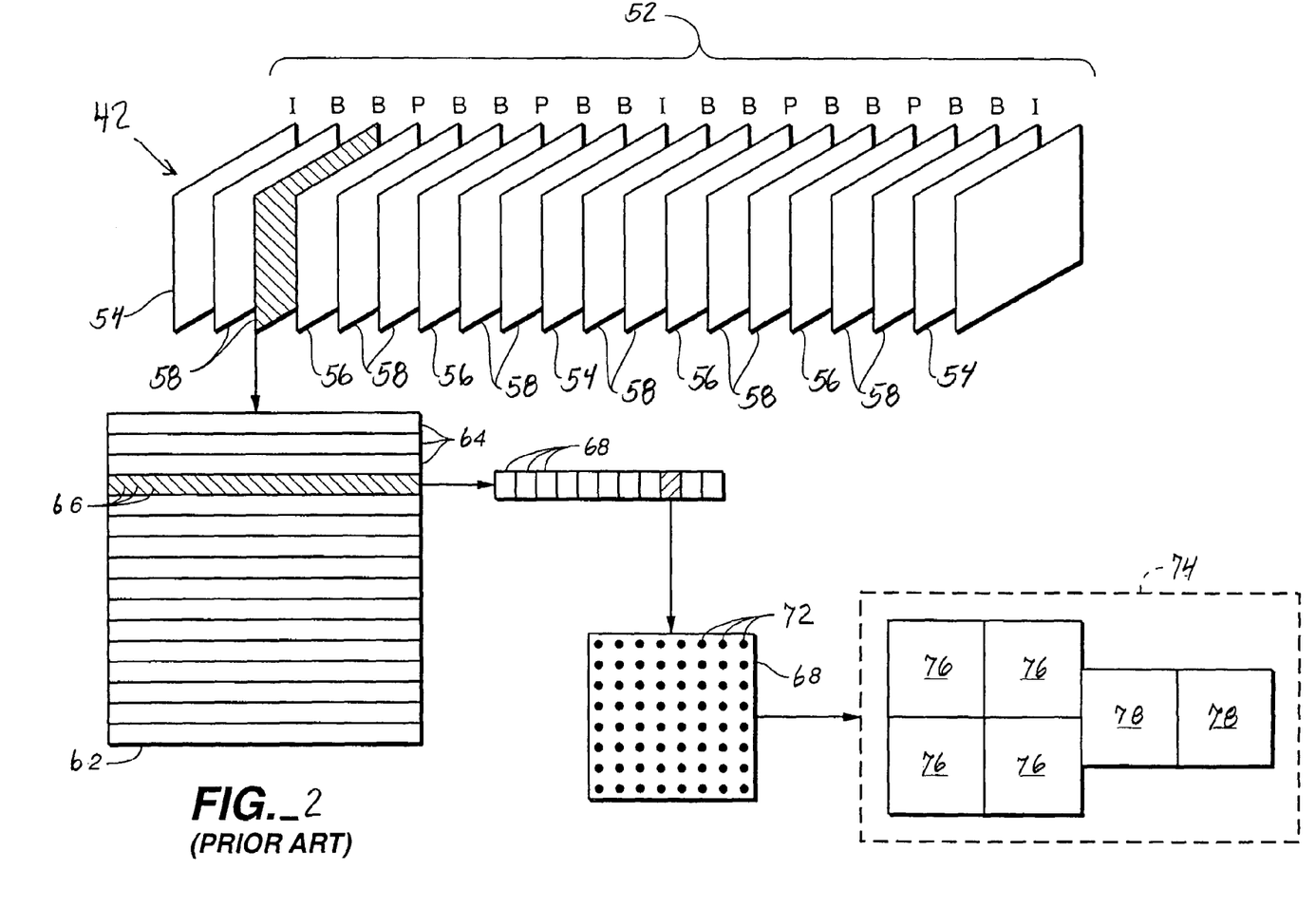
FIG. 2 is a block diagram illustrating how frames of digital video data are processed during formation of the conventional MPEG serial system stream as depicted in FIG. 1 to extract macroblocks that consist of luminance and chrominance blocks.

In this way, the MPEG serial system stream 46 incorporates the compressed video bitstream 42 that may decompressed to present a succession of frames of video. As illustrated in FIG. 2, the compressed video bitstream 42 produced by the video encoder 38 consists of successive groups of pictures ("GOPs") 52. Each GOP 52 includes intra ("I") frames 54, predicted ("P") frames 56, and bidirectional ("B") frames 58. An I frame 54 of MPEG compressed digital video data is both encoded and decoded without direct reference to video data in other frames. Therefore, MPEG compressed video data for an I frame 54 represents an entire uncompressed frame of digital video data. A MPEG P frame 56 is both encoded and decoded with reference to a prior frame of video data, either reference to a prior I frame 54 or reference to a prior P frame 56. A B frame 58 of MPEG encoded digital video data is both encoded and decoded with reference both to a prior and to a successive reference frame, i.e. reference to decoded I or P frames 54 or 56. The MPEG-1 and MPEG-2 specifications define a GOP 52 to be one or more I frames 54 together with all of the P frames 56 and B frames 58 for which the one or more I frames 54 are a reference. MPEG-2 operates in a manner analogous to MPEG-1 with an additional feature that the I frames 54, P frames 56, and a B frames 58 of the MPEG-1 GOP 52 could be fields of the I frames 54, P frames 56, and a B frames 58, thus permitting field-to-field motion compensation in addition to frame-to-frame motion compensation.

Regardless of whether an I frame 54, a P frame 56, or a B frame 58 is being compressed, in performing MPEG compression each successive frame 62 of uncompressed digital video data is divided into slices 64 representing, for example, sixteen (16) immediately vertically-adjacent, non-interlaced television scan lines 66. An MPEG-1 slice 64 can be defined to specify an entire frame of decompressed video. However, an MPEG-2 slice 64 can be defined to specify video that has a maximum height of one slice 64, i.e. sixteen (16) immediately vertically-adjacent, non-interlaced television scan lines 66, and which spans the frame's width. MPEG compression further divides each slice 64 into macroblocks 68, each of which stores data for a matrix of picture elements ("pels") 72 of digital video data, e.g. a 16×16 matrix of pels 72.

MPEG compression processes the digital video data for each macroblock 68 in a YCbCr color space. The Y component of this color space represents the brightness, i.e. luminance, at each pel 72 in the macroblock 68. The Cb and Cr components of the color space represent subsampled color differences, i.e. chrominance, for 2×2 groups of immediately adjacent pels 72 within the macroblock 68. Thus, each macroblock 68 consists of six (6) 8×8 blocks of digital video data that in the illustration of FIG. 1 are enclosed within a dashed line 74. The six (6) 8×8 blocks of digital video data making up each macroblock 68 includes:

1. four (4) 8×8 luminance blocks 76 that contain brightness data for each of the 16×16 pels 72 of the macroblock 68; and
2. two (2) 8×8 chrominance blocks 78 that respectively contain subsampled Cb and Cr color difference data also for the pels 72 of the macroblock 68.

In compressing all the macroblocks 68 of each I frame 54 and certain macroblocks 68 of P frames 56 and B frames 58, MPEG digital video compression separately compresses data of the luminance blocks 76 and of the chrominance blocks 78, and then combines the separately compressed blocks 76 and 78 into the compressed video bitstream 42.

Figure 3:
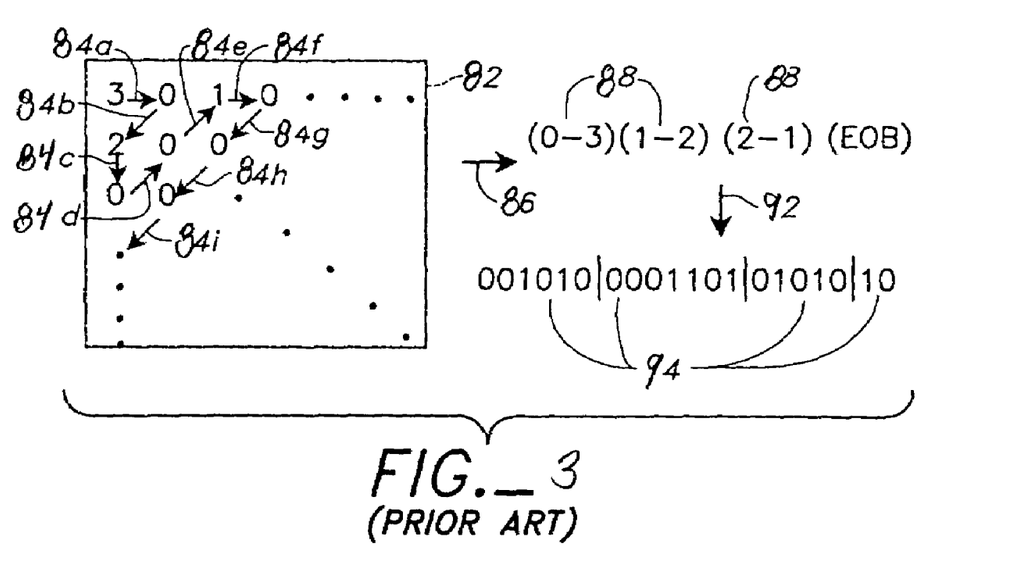
FIG. 3 is a block diagram depicting application first of the prior art DCT, then run-length coding, and finally Huffman coding to luminance and chrominance blocks that make up macroblocks extracted from a frame of digital video data as illustrated in FIG. 2.

Mathematically, the four (4) luminance blocks 76 and two (2) chrominance blocks 78 of each macroblock 68 respectively constitute 8×8 matrices. Referring now to FIG. 3, compressing each macroblock 68 includes independently computing an 8×8 Discrete Cosine Transform ("DCT") 82 for each of the six (6) 8×8 blocks 76 and 78 making up the macroblock 68. The six (6) 8×8 DCTs 82, only one of which is depicted in FIG. 3, respectively map the data of the six (6) blocks 76 and 78 into sixty-four (64) frequency coefficients. Each frequency coefficient in the DCT 82 represents a weighing factor that is applied to a corresponding basis cosine curve. The sixty-four (64) basis cosine curves vary in frequency. Low cosine frequencies encode coarse luminance or chrominance structure in the macroblock 68. High cosine frequencies encode detail luminance or chrominance features in the macroblock 68. Adding together the basis cosine curves weighted by the sixty-four (64) DCT coefficients reproduces exactly the 8×8 matrix of an encoded block 76 or 78.

By themselves, the coefficients of the DCT 82 for a block 76 or 78 provide no compression. However, because video data for most macroblocks 68 lack detail luminance or chrominance features, most high-frequency coefficients for the DCTs 82 are typically zero (0) or near zero (0). To further increase the number of zero coefficients in each DCT 82, MPEG encoding divides each coefficient by a quantization value which generally increases with the frequency of the basis cosine curve for which the coefficient is a weight. Dividing the coefficients of the DCT 82 by their corresponding MPEG quantization values reduces image detail. Large numeric values for quantization reduce detail more, but also provide greater data compression for reasons described in greater detail below.

After quantizing the DCT 82, the quantized frequency coefficients are processed in a zigzag order as indicated by arrows 84a-84i in FIG. 3. Applying a zigzag order to the quantized frequency coefficients tends to produce long sequences of DCT frequency coefficients having zero (0) value. Run-length encoding, indicated by an arrow 86 in FIG. 3, is then applied to the zigzag order of the quantized DCT coefficients. For those quantized DCT coefficients that differ from the immediately preceding and succeeding DCT coefficient along the zigzag path, run-length encoding specifies a run-length of zero (0), i.e. a single occurrence of the quantized DCT coefficient. Long sequences of zero (0) coefficients along the zigzag path depicted in FIG. 3, are efficiently encoded using a lesser amount of data. MPEG run-length encoding represents each such sequence of consecutive identical valued quantized frequency coefficients by a token 88, depicted in FIG. 3, which specifies how many consecutive quantized frequency coefficients have the same value together with the numerical value for that set of quantized frequency coefficients.

The tokens 88 extracted from the sequence of quantized frequency coefficients are then further compressed through Huffman coding, indicated by an arrow 92 in FIG. 3. Huffman coding converts each token 88 into a variable length code ("VLC") 94. MPEG assigns values that are only 2-3 binary digits ("bits") long for the VLCs 94 representing the most common tokens 88. Conversely, MPEG video compression assigns values that are up to 28 bits long for the VLCs 94 representing rare tokens 88. The Huffman coded VLCs 94 thus determined are then appropriately merged to form compressed video bitstream 42 depicted in FIG. 1.

While decoding the compressed video bitstream 42 assembled as described above reproduces frames of motion video that are generally visually acceptable, reproduced frames of still images, particularly still images containing text, are in many instances, if not most, visually unacceptable. As described above, the process depicted in FIG. 3 of separately computing the DCTs 82 for the luminance blocks 76 and the chrominance blocks 78, quantizing the DCT coefficients, zigzag ordering of quantized DCT coefficients, run-length encoding, and finally Huffman coding generally remove a significant amount of high frequency data from MPEG compressed I frames 54. Decoding of I frames 54 from which high frequency data has been removed produces an image having less detail, e.g. sharp corners and abrupt transitions from one color or intensity to another, than appeared in the uncompressed frame of video data. However, MPEG compression does not completely discard this high frequency data, i.e. image detail. MPEG compression attempts to encode this high frequency data into successive P frames 56 and B frames 58 that use the I frame 54 as a reference, either directly or indirectly. Consequently, after decoding the lesser detail in each I frame 54 of a still image, decoding subsequent P frames 56 and B frames 58 increases, over time, the detail present in the video images until the next I frame 54 is decoded.

For the preceding reasons, image detail in frames 62 decoded from the conventional MPEG compressed video bitstream 42 that reproduce a still image, particularly a still image containing text, tends to be lower at the beginning of each GOP 52 when an I frame 54 is decoded, increase during decoding of successive P frames 56 and B frames 58 in the GOP 52, only to decrease again upon decoding the next I frame 54. Thus, a decoding of the MPEG compressed video bitstream 42 of a still image frequently produces a video image that appears to pulse visually, usually at a frequency that is identical to the frequency at which GOPs 52 occur in the compressed video bitstream 42, e.g. twice per second. This visual pulsing of a decompressed MPEG compressed video bitstream 42 of a still image in many instances makes them commercially unacceptable.

In addition to the conventional MPEG compressed video bitstream 42, there also exists another technique for compressing the video signal of a conventional television broadcast frequently identified as motion JPEG. The compressed video bitstream 42 for motion JPEG includes only I frames 54, and therefore omits both P frames 56 and B frames 58. Consequently, images decoded from a motion JPEG compressed video bitstream having a quality equivalent to that of MPEG compressed video require a larger amount of data. Alternatively, images decoded from motion JPEG compressed video bitstream that have an amount of data equivalent to MPEG compressed video possess a lesser quality than decoded MPEG-1 images.

BRIEF SUMMARY OF THE INVENTION

An object of the present invention is to provide a compressed video bitstream that, when decompressed, faithfully reproduces a still image.

Yet another object of the present invention is to provide a compressed video bitstream that preserves detail that occur in still images.

Another object of the present invention is to provide a compressed video bitstream that preserves sharp corners that occur in still images.

Another object of the present invention is to provide a compressed video bitstream that preserves abrupt transitions from one color to another that occur in still images.

Another object of the present invention is to provide a compressed video bitstream that preserves abrupt transitions from one intensity to another that occur in still images.

Another object of the present invention is to provide a compressed video bitstream that upon being decompressed produces a video image that does not appear to pulse visually.

Yet another object of the present invention is to swiftly and efficiently assemble a MPEG compressed video bitstream that, when decompressed, faithfully reproduces a still image.

Briefly, the present invention is a method for producing a compressed video bitstream that includes compressed video data for a plurality of frames from data that specifies a single still image. A first step in producing the compressed video bitstream is fetching the data for the still image, and then encoding the data for the still image into data for an intra ("I") frame. The data for the I frame is then stored to be combined with other data in the compressed video bitstream.

The compressed video bitstream in accordance with the present invention includes at least a single copy of the stored I frame together with at least one null frame, and various headers required for decodability of the compressed video bitstream. The specific headers will vary depending upon the video compression standard, e.g. MPEG-1 or MPEG-2, that a decoder processes. Decoding of the compressed video bitstream assembled in accordance with the present invention produces frames of decoded video that do not appear to pulse visually.

An advantage of the present invention in comparison with motion JPEG is that the compressed video bitstream produced in accordance with the present invention either is much more compact for the same decoded image quality, or upon being decoded produces significantly better quality images for an equivalent amount of data.

These and other features, objects and advantages will be understood or apparent to those of ordinary skill in the art from the following detailed description of the preferred embodiment as illustrated in the various drawing figures.

DETAILED DESCRIPTION

Figure 4:
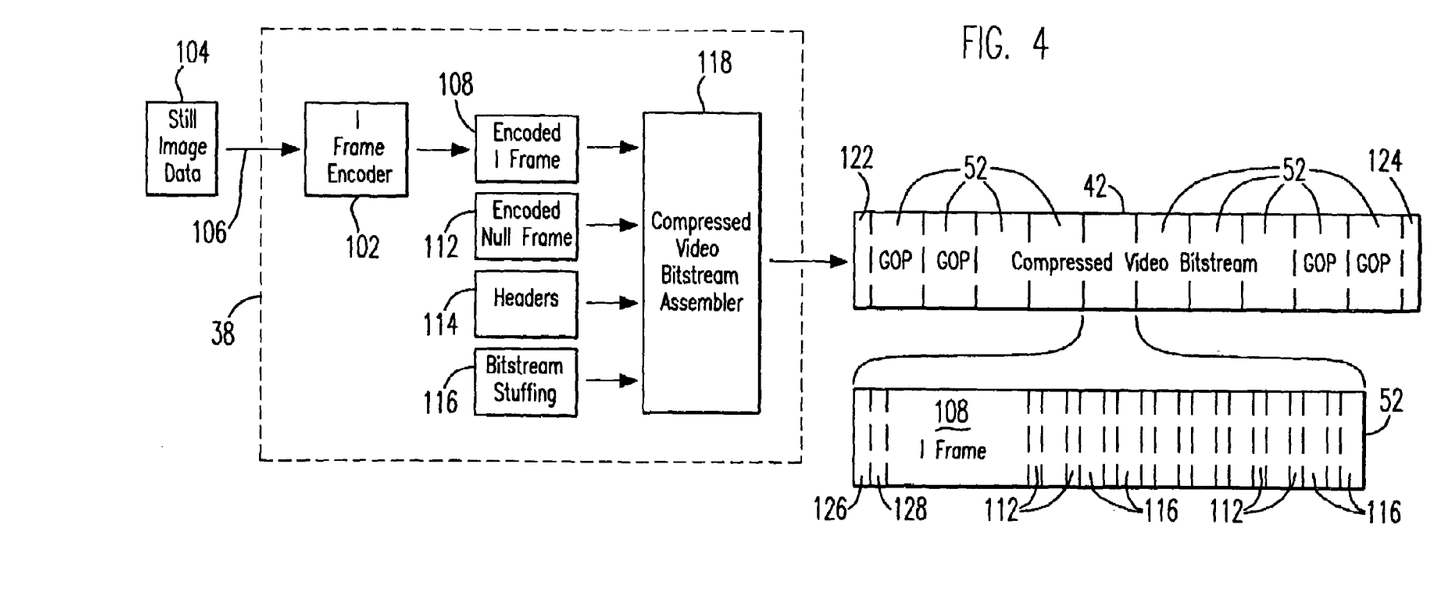
FIG. 4 is a block diagram depicting encoding, in accordance with the present invention, a still image, and assembly of the encoded still image into a MPEG-1 compressed video bitstream.

FIG. 4 depicts the video encoder 38 adapted for encoding still images to assemble the compressed video bitstream 42 in accordance with the present invention. The video encoder 38 includes an I frame encoder 102 that fetches a single frame of still-image data 104 such as bit-map data for text, as indicated by an arrow 106 in FIG. 4. The I frame encoder 102 encodes the still-image data 104 into data for a single encoded I frame 108 that is stored into a high-speed local memory not separately illustrated in any of the FIGs. Storing the encoded I frame 108 into a high speed memory permits its quick retrieval during subsequent assembly of the compressed video bitstream 42.

Those familiar with MPEG will understand that certain parameters may be supplied to the video encoder 38 before the I frame encoder 102 encodes the still-image data 104 to specify characteristics of the encoded I frame 108. Similarly, those familiar with MPEG are aware that MPEG decoders include a buffer memory for storing the compressed video bitstream 42 during decoding. Because, as described below, each GOP 52 encoded in accordance with the present invention for decoding by an MPEG-1 decoder includes only a single I frame 54, the parameters supplied to the video encoder 38 are preferably chosen so the amount of data produced for the I frame 54 approaches, but remains less than, the storage capacity of the buffer memory included in the decoder. By choosing parameters for MPEG encoding of the still-image data 104 that produce an amount of data for the I frame 54 which approaches, but remains less than, the storage capacity of the buffer memory, the compressed video bitstream 42 assembled in accordance with the present invention displays the highest quality decoded image. Generally, most MPEG decoders include a buffer that is no smaller than 40960 bytes, and may be as large as 241,664 bytes.

In addition to storing the encoded I frame 108, as illustrated in FIG. 4, the video encoder 38 also includes stored data specifying an encoded MPEG null frame 112, various headers 114 that are required for assembling the GOP 52, and bitstream stuffing 116. As described in greater detail below, a compressed-video-bitstream assembler 118 included in the video encoder 38 appropriately concatenates data for the encoded I frame 108, the null frame 112, headers 114, and perhaps the bitstream stuffing 116 to assemble at least one GOP 52 for the compressed video bitstream 42 depicted in FIG. 4. A table set forth below lists various elements that must be included in the compressed video bitstream 42 to be decodable in accordance respectively with the MPEG-1 and MPEG-2 standards.

| MPEG-1 |
| --- |
| sequence_header |
| group_of_pictures |
| picture_ start code |
| I Frame Data |
| picture_ start code |
| Null Frame Data |
| sequence_end code |

| MPEG-2 |
| --- |
| sequence_header |
| sequence_extension |
| picture_header |
| picture_coding_extension |
| I Frame Data |
| picture_header |
| picture_coding_extension |
| Null Frame Data |
| sequence_end code |

As indicated in the preceding tables, if the serial system stream 46 is to be decodable in accordance with the MPEG-1 standard, then it begins with a sequence_header 122, illustrated in FIG. 4, that the compressed-video-bitstream assembler 118 extracts from the headers 114. The serial system stream 46 then includes one or more GOPs 52 which establish a time interval during which a decoder, while decoding the compressed video bitstream 42, produces an image of the still-image data 104. The compressed video bitstream 42 then ends with a sequence_end code 124. Each GOP 52 included in the compressed video bitstream 42 begins with a group_start code 126 that the compressed-video-bitstream assembler 118 extracts from the headers 114. A copy of the encoded I frame 108, to which the compressed-video-bitstream assembler 118 prefixes a picture_start code 128 that the compressed-video-bitstream assembler 118 extracts from the headers 114, follows immediately after the picture_start code 128. The encoded I frame 108 is followed by one or more copies of the null frame 112 to each one of which the compressed-video-bitstream assembler 118 also prefixes the picture_start code 128, again extracted from the headers 114. The encoded I frame 108 plus the null frames 112 establish a time interval during which a decoder, while decoding the GOP 52, produces an image of the still-image data 104. If it is intended to transmit the compressed video bitstream 42 via a communication channel that requires a pre-established bitrate, e.g. via a T1 telecommunications network, then the compressed-video-bitstream assembler 118 appends sufficient bitstream stuffing 116 to each of the null frames 112 to satisfy the communication channel's bitrate requirement.

As indicated in the preceding tables, omission of the group_start code 126 from the GOP 52 illustrated in FIG. 4 yields an illustration accurately depicting a compressed video bitstream 42 in accordance with the present invention that a MPEG-2 decoder may process. For an MPEG-2 compressed video bitstream 42, the compressed-video-bitstream assembler 118 prefixes both a picture_header and a picture_coding_extension to the encoded I frame 108 and null frames 112 rather than the picture_start code required for a MPEG-1 compressed video bitstream 42.

While the tables set forth above specify a minimum amount of header data absolutely necessary for the compressed video bitstream 42 to be decodable, the compressed video bitstream 42 in accordance with the present invention preferably includes the header data set forth in the following tables.

| MPEG-1 |
|---|
| sequence_header |
| group_of_pictures |
| picture_ start code |
| I Frame Data |
| picture_ start code |
| Null Frame Data |
| Stuffing as needed |
| sequence_end code |

| MPEG-2 |
|---|
| sequence_header |
| sequence_extension |
| group_start code |
| picture_header |
| picture_coding_extension |
| I Frame Data |
| picture_header |
| picture_coding_extension |
| Null Frame Data |
| Stuffing as needed |
| sequence_end code |

From the preceding tables it is readily apparent that each GOP 52 in the preferred compressed video bitstream 42, in addition to the I Frame and Null Frame data, includes both the codes for specifying the start of a sequence, and the codes for specifying the start of a GOP.

While there exist various differing ways in which the null frame 112 may be encoded, the null frame 112 in accordance with the present invention for an MPEG-1 compressed video bitstream 42 preferably is that set forth below. Please note that in the following tables the MPEG-1 null frame 112 employs a single slice 64 to specify an entire frame 62 of decompressed video. However, the MPEG-2 null frame 112 specifies decompressed video having a maximum height of one slice 64, i.e. sixteen (16) immediately vertically-adjacent, non-interlaced television scan lines 66, and which spans the frame's width.

| MPEG-1 NULL FRAME | |
|---|---|
| PICTURE_START CODE | 0000 0000 0000 0000 0000 0001 0000 0000 |
| temp_ref | (Ten (10) bit field that increments each frame.) |
| P_TYPE | 010 |
| vbv_delay | 1111 1111 1111 1111 |
| full_pel_forward_vector | 0 |
| forward_f_code | 001 |
| (Start Code Alignment Stuffing) | 0000000 |
| SLICE_MIN_START | 0000 0000 0000 0000 0000 0001 0000 00001 |
| quantize_scale | 00001 |
| extra_slice_bit | 0 |
| first macroblock_address_increment (1) | 1 |
| macroblock_type (hor_forward) | 001 |
| motion_forward_code | 1 |
| motion_vertical_code | 1 |
| macro block escapes repeat for NumEscapes in the frame | 000 0000 1000 |
| last macroblock_address_increment | (Selected from addrinctab set forth below.) |
| macroblock type hor_forward | 001 |
| motion_forward_code | 1 |
| motion_vertical_code | 1 |

Parameters used in specifying the MPEG-1 null frame 112 are as follows.

TotalBlocks=frame_width×frame_height/(16×16)

NumEscapes=(TotalBlocks−2)/33

NumRemainingBlocks=TotalBlocks−(NumEscapes× 33)−2

Addrinctab is a table which specifies variable length codes that represent the NumRemainingBlocks calculated above. The addrinctab table includes thirty-three (33) pairs of numbers. The first pair of numbers specifies a variable length code to be used if the NumRemainingBlocks=1, the second pair of numbers specifies a variable length code to be used if the NumRemainingBlocks=2, and so on. The first number in each pair represents a binary number that specifies the variable length code to be used, and the second number in each pair specifies the number of binary digits in the variable length code. For example, if the NumRemainingBlocks equals 5, it is represented by the binary code 0010.

{NumberofBits, Value}
addrinctab[33] =
{

-continued

```
        {0x01,1}, {0x03,3}, {0x02,3}, {0x03,4},
        {0x02,4}, {0x03,5}, {0x02,5}, {0x07,7},
        {0x06,7}, {0x0b,8}, {0x0a,8}, {0x09,8},
        {0x08,8}, {0x07,8}, {0x06,8}, {0x17,10},
        {0x16,10}, {0x15,10}, {0x14,10}, {0x13,10),
        {0x12,10}, {0x23,11}, {0x22,11}, {0x21,11},
        {0x20,11}, {0x1f,11}, {0x1e,11}, {0x1d,11},
        {0x1c,11}, {0x1b,11}, {0x1a,11}, {0x19,11},
        {0x18,11},
    };
```

The null frame 112 in accordance with the present invention for an MPEG-2 compressed video bitstream 42 preferably is that set forth below.

| MPEG-2 NULL FRAME | |
|---|---|
| PICTURE_START CODE | 0000 0000 0000 0000 0000 0001 0000 0000 |
| temp_ref | (Ten (10) bit field that increments each frame.) |
| P_TYPE | 010 |
| vbv_delay | 1111 1111 1111 1111 |
| full_pel_forward code | 0 |
| forward_f_code | 111 |
| (Start Code Alignment Stuffing) | 0000000 |
| EXT_START_CODE | 0000 0000 0000 0000 0000 0001 1011 0101 |
| CODING EXTENSION | 1000 |
| forw_hor_f_code | 0000 (Set to value specified by encoding parameters.) |
| forw_ver_f_code | 0000 (Set to value specified by encoding parameters.) |
| back_hor_f_code | 0000 (Set to value specified by encoding parameters.) |
| back_ver_f_code | 0000 (Set to value specified by encoding parameters.) |
| intra_dc_prec | 00 (Set to value specified by encoding parameters.) |
| picture_structure | 00 (Set to value specified by encoding parameters.) |
| top_field_first | 0 (Set to value specified by encoding parameters.) |
| frame_pred dct | 0 (Set to value specified by encoding parameters.) |
| concealment_motion_vectors | 0 (Set to value specified by encoding parameters.) |
| q_scale_type | 0 (Set to value specified by encoding parameters.) |
| intra_vic_format | 0 (Set to value specified by encoding parameters.) |
| alternate_scan | 0 (Set to value specified by encoding parameters.) |
| repeat_first_field | 0 (Set to value specified by encoding parameters.) |
| chrom_420_type | 0 (Set to value specified by encoding parameters.) |
| progressive_frame | 0 (Set to value specified by encoding parameters.) |

-continued

| MPEG-2 NULL FRAME | |
|---|---|
| composite_display_flag | 0 (Set to value specified by encoding parameters.) |
| for each slice until NumSlices: | 00000 0000 0000 0000 |
| SLICE_MIN_START +1 for each slice | 0001 0000 00001 |
| quantize_scale | 00001 |
| extra_slice_bit | 0 |
| first macroblock_address_increment (1) | 1 |
| macroblock_type (hor_forward) | 001 |
| motion_forward_code | 1 |
| motion_vertical_code | 1 |
| macro block escapes repeat for NumEscapes in the slice | 000 0000 1000 |
| last macroblock_address_increment | (Selected from addrinctab set forth above.) |
| macroblock type hor_forward | 001 |
| motion_forward_code | 1 |
| motion_vertical_code | 1 |

Parameters used in specifying the MPEG-2 null frame 112 are as follows.

TotalBlocksPerSlice=PictureWidth/16

NumEscapesPerSlice=(TotalBlocksPerSlice−2)/33

NumRemainingBlocksPerSlice=TotalBlocksPerSlice−(NumEscapesPerSlice×33)−2

NumSlices=PictureHeight/16

Set forth below is a listing of a computer program in the C++ programming language for generating the null frame 112.

```
////////////////////////////////////////////////////
/////
/// The following code is a sample of the creation of
///        a NULL P frame
void putbits (int BitValue ,int BitLength);
//      putbits writes BitLength bits into MPEG stream having a
//      value of BitValue
void alignbits( );
/// writes enough 0 bits to the MPEG stream to align the bits
//      to a byte boundary
/// taken from MPEG-1 and MPEG-2 specifications:
static VLCtable addrinctab[33] =
{
    {0x01,1},   {0x03,3},   {0x02,3},   {0x03,4},
    {0x02,4},   {0x03,5},   {0x02,5},   {0x07,7},
    {0x06,7},   {0x0b,8},   {0x0a,8},   {0x09,8},
    {0x08,8},   {0x07,8},   {0x06,8},   {0x17,10},
    {0x16,10},  {0x15,10},  {0x14,10},  {0x13,10},
    {0x12,10},  {0x23,11},  {0x22,11},  {0x21,11},
    {0x20,11},  {0x1f,11},  {0x1e,11},  {0x1d,11},
    {0x1c,11},  {0x1b,11},  {0x1a,11},  {0x19,11},
    {0x18,11},
};
#define PICTURE_START_CODE   0x00000100
#define P_TYPE               2
#define SLICE_MIN_START      0x00000101
#define EXT_START_CODE       0x000001BA
#define CODING_ID            0xA
#define TOP_FIELD            1
#define BOTTOM_FIELD         2
#define FRAME_PICTURE        3
/// The following code writes a single Null MPEG-1 P Frame to the
//      compressed video bitstream. TempRef is a number,
//      starting with 0 that is incremented every frame after
//      the start of the GOP and reset to 0 at each new GOP
//      The VBV delay is calculated for each frame
```

-continued

```
//              or set to 0xffff for non constant bit rate
MakeMpeg1NullFrame (int TempRef, int VBVDelay)
{
int fr,iii;
int TotalBlocks = (picture_width *picture_height)/(16*16);
int NumEscapes = (TotalBlocks - 2)/33;
int NumRemainingBlocks = TotalBlocks - NumEscapes*33 - 2;
    putbits (PICTURE_START_CODE,32); /// header
    putbits (TempRef,10);
    putbits (P_TYPE,3);
    putbits (VBVDelay,16);
    putbits (0x0,1);            //macroblock_type
    putbits (0x1,3);            // forward_f_code
    putbits (0x0,7);            // stuffing so start code aligns
    putbits (SLICE_MIN_START,32); // slice start
    putbits (0x1,5);            // quantize_scale
    putbits (0x0,1);            // extra_slice_bit
    putbits (0x1,1);            // macroblock increment (1)
    putbits (0x1,3);            // macroblock type (hor_forward)
    putbits (0x1,1);            // motion_forward_code
    putbits (0x1,1);            // motion_vertical_code
    for (iii = 0; iii < NumEscapes; iii+=1)
        putbits (0x8,11);       // escape
    putbits (addrinctab[NumRemainingBlocks].code,
        addrinctab[NumRemainingBlocks].len);
    putbits (0x1,3);            // macroblock type (hor_forward)
    putbits (0x1,1);            // motion_forward_code
    putbits (0x1,1);            // motion_vertical_code
    putbits (0x0,1);            // stuffing
    alignbits( );
}
/// The following code writes a single Null MPEG-2 P Frame to the
//              compressed video bitstream. TempRef is a number,
//              starting with 0 that is incremented every frame after
//              the start of the GOP and reset to 0 at each new GOP
//              The VBV delay is calculated for each frame
//              or set to 0xffff for non constant bit rate
MakeMpeg2NullFrame (int TempRef, int VBVDelay)
{
int fr,iii,CurrentSlice;
int TotalBlocksPerSlice = (tce.width)/(16); //*2 for each field
int NumEscapesPerSlice = (TotalBlocksPerSlice - 2)/33;
int NumRemainingBlocksPerSlice = TotalBlocksPerSlice -
NumEscapesPerSlice*33 - 2;
int NumSlices = tce.height/16;
    putbits (PICTURE_START_CODE,32); /// header
    putbits (TempRef,10);
    putbits (P_TYPE,3);         //2
    putbits (VBVDelay,16);
    putbits (0x0,1);            //for full_pel_forward_code
    putbits (0x7,3);            // forward_f_code          5
    putbits (0x0,7);            //// stuffing so start code aligns
    AddNullPictureExtension(3); // 3=frame picture
    alignbits( );               // add bytes to align to boundaries
/// create Sequence of macro_blocks for each slice
    for (CurrentSlice = 0; CurrentSlice < NumSlices;
CurrentSlice+=1)
        {
        putbits (SLICE_MIN_START+CurrentSlice,32); // slice start
        putbits (0x1,5);        // quantizer_scale
        putbits (0x0,1);        // extra_slice_bit
        putbits (0x1,1);        // macroblock increment (1)
        putbits (0x1,3);        // macroblock_type (MC forward,
                                // Not Coded)
        putbits (0x1,1);        // motion_forward_code
        putbits (0x1,1);        // motion_vertical_code
// for add escapes for number of escapes
        for (iii = 0; iii < NumEscapesPerSlice; iii+=1)
        putbits (0x8,11);       ///escape code
// add address increment for remainding blocks
                putbits(addrinctab[NumRemainingBlocksPerSlice].
                    code, addrinctab[NumRemainingBlocksPerSlice].len);
        /// last macro_block per slice
        putbits (0x1,3);        ///macroblock type MC not coded
                //   macroblock_modes( )
        putbits (0x1,1);        // motion_forward_code
        putbits (0x1,1);        // motion_vertical_code
        putbits (0x0,5);        /// align
        alignbits( );  // add bytes to align to boundaries
        } // for each slice
}
```

The AddNullPictureExtension subroutine set forth below writes picture extensions to the compressed video bitstream 42.

```
AddNullPictureExtension(int Null_picture_structure)
// picture_structure = 1 top field; 2 bottom field; 3 frame
picture
{
    alignbits( );
    putbits(EXT_START_CODE,32); /* extension_start_code */
    putbits(CODING_ID,4); /* extension_start_code_identifier */
    putbits(forw_hor_f_code,4); /*
    forward_horizontal_f_code */
    putbits(forw_vert_f_code,4); /*
    forward_vertical_f_code */
    putbits(back_hor_f_code,4); /* backward_horizontal_f_code */
    putbits(back_vert_f_code,4); /*
    backward_vertical_f_code */
    putbits(dc_prec,2); /* intra_dc_precision */
    putbits(Null_picture_structure,2); /* picture_structure */
    putbits((pict_struct==FRAME_PICTURE) ?topfirst:0,1);
                                 /* top_field_first */
    putbits(frame_pred_dct,1); /* frame_pred_frame_dct */
    putbits(0,1); /* concealment_motion_vectors */
    putbits(q_scale_type,1); /* q_scale_type */
    putbits(0,1); /* intra_vlc_format force it to 0 */
    putbits(altscan,1); /* alternate_scan */
    putbits(repeatfirst,1); /* repeat_first_field */
    putbits(chroma_420_type,1); /* chroma_420_type */
    putbits(prog_frame,1); /* progressive_frame */
    putbits(0,1); /* composite_display_flag */
}
```

If the video encoder 38 depicted in FIG. 4 is implemented by a computer program executed by a Pentiums processor operating at 450 MHz, then the video encoder 38 can encode the compressed video bitstream 42 in accordance with the present invention at two hundred and fifty (250) times faster than a decoder would present visual images from the decoded compressed video bitstream 42.

In addition to the MPEG-1 and MPEG-2 standards identified above, additional details regarding MPEG video compression and assembling the compressed video bitstream 42 are set forth in the following publications that are hereby incorporated by reference.

"MPEG Video Compression Standard" by Joan L. Mitchell, William B. Pennebaker, Chad E. Fogg, and Didier J. LeGall published by International Thomson Publishing, copyright 1996.

"Measuring and Regulating Synchronization of Merged Video and Audio Data," Patent Cooperation Treaty ("PCT") international patent application PCT/US94/09565 published 7 Mar. 1996, as WO 96/07274.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for producing a compressed video bitstream that includes compressed video data for a plurality of frames from data that specifies a single still image, the method comprising the steps of:
   fetching the data for the still image;
   encoding the data for the single still image into data for an I frame;
   storing the encoded I frame data; and
   assembling the compressed video bitstream by appropriately combining data for:
      at least a single copy of the stored I frame;
      at least one null frame; and
      various headers required for decodability of the compressed video bitstream;
   whereby decoding of the compressed video bitstream produces frames of video which produce images that do not appear to pulse visually.

2. The method of claim 1 wherein:
   the assembled compressed video bitstream is decodable in accordance with the MPEG-1 standard; and
   the various headers assembled into the compressed video bitstream include:
      a sequence_header beginning the compressed video bitstream;
      at a beginning of group of pictures, a group_start_code;
      for each encoded frame, a picture_start_code; and
      a sequence_end_code ending the compressed video bitstream.

3. The method of claim 1 wherein:
   the assembled compressed video bitstream is decodable in accordance with the MPEG-2 standard; and
   the various headers assembled into the compressed video bitstream include:
      a sequence_header beginning the compressed video bitstream;
      for each encoded frame:
         a picture_header; and
         a picture_coding_extension; and
      a sequence_end_code ending the compressed video bitstream.

4. The method of claim 1 wherein parameters used in encoding the data for the still image produce an amount of data for the I frame that approaches, but remains less than, storage capacity of a buffer memory included in a decoder that stores the compressed video bitstream.

5. The method of claim 1 wherein null frames assembled into the compressed video bitstream also include bitstream stuffing whereby the compressed video bitstream is transmittable at a pre-established bitrate.

6. The method of claim 1 wherein the various headers assembled into the compressed video bitstream include:
   a sequence_header beginning the compressed video bitstream;
   at a beginning of group of pictures, a group_start_code;
   for each encoded frame, a picture_start_code; and
   a sequence_end_code ending the compressed video bitstream.

7. The method of claim 1 wherein the various headers assembled into the compressed video bitstream include:
   a sequence_header beginning the compressed video bitstream;
   for each encoded frame:
      a picture_header; and
      a picture_coding_extension; and
   a sequence_end_code ending the compressed video bitstream.

* * * * *